United States Patent [19]

Tohzuka et al.

[11] Patent Number: 4,836,944
[45] Date of Patent: Jun. 6, 1989

[54] HALOGEN-CONTAINING POLYETHER AND ITS USE

[75] Inventors: Takashi Tohzuka; Sueyoshi Ishikawa; Katsuyoshi Kubo; Yoshitaka Honda; Yukio Ohmure, all of Osaka; Norio Kataoka, Kyoto, all of Japan

[73] Assignee: Daikin Industries Ltd., Osaka, Japan

[21] Appl. No.: 200,962

[22] Filed: Jun. 1, 1988

[30] Foreign Application Priority Data

Jun. 2, 1987 [JP] Japan ................................. 62-139516
Jun. 2, 1987 [JP] Japan ................................. 62-139517
Jul. 24, 1987 [JP] Japan ................................. 62-186020

[51] Int. Cl.$^4$ .......................................... C10M 147/04
[52] U.S. Cl. .......................................... 252/54; 252/58; 568/683; 568/684
[58] Field of Search ........................... 252/54, 58, 147; 568/683, 684

[56] References Cited

U.S. PATENT DOCUMENTS 3,505,229  4/1970  Skehan et al. ........................ 252/58
3,909,431  9/1975  Figiel .................................... 252/54
4,657,687  4/1987  Caporiccio et al. .................. 252/58
4,724,092  2/1988  Fakui et al. .......................... 252/58

Primary Examiner—Jacqueline V. Howard
Attorney, Agent, or Firm—Birch, Stewart, Kolasch & Birch

[57] ABSTRACT

A halogen-containing polyether which comprises a repeating unit structure of the formula:

$$-(CH_2CF_2CF_2O)_a-$$
$$-(CHClCF_2CF_2O)_b-(CCl_2CF_2CF_2O)-$$
$$_c-(CHFCF_2CF_2O)_d-(CFClCF_2CF_2O)_e-(CF_2CF_2CF_2O)_f- \quad (I)$$

wherein a, b, c, d, e and f are each 0 or a positive integer and satisfy the following equations:

$$2 \leq a+b+c+d+e+f \leq 200 \text{ and } 1 \leq a+c+d+f$$

and at least one terminal group selected from the group consisting of groups represented by the formulas:

$$-CH_2OH, -COOR^1, -CONR^1{}_2, -COOOR^2Ph$$
$$\text{and } -R^2Ph$$

wherein $R^1$ is a hydrogen atom, a $C_1$-$C_5$ alkyl group or an aromatic group, $R^2$ is a divalent organic group and Ph is an aromatic group, which has good lubricating properties.

6 Claims, 1 Drawing Sheet

HALOGEN-CONTAINING POLYETHER AND ITS USE

BACKGROUND OF THE INVENTION

1. Field of the Invention

The present invention relates to a halogen-containing polyether and its use. More particularly, it relates to a halogen-containing polyether having good lubricating properties and its use as a lubricant.

2. Description of the Related Art

With the development of a magnetic recording medium, greater attention is paid the lubricity between a magnetic head and the surface of a magnetic layer of the recording medium.

Hitherto, as an effective lubricant for coating the magnetic recording medium, is a perfluoropolyether of the formula:

$$F-[CF(CF_3)-CF_2-O]_n-C_2F_5$$

(Krytox, a trade mark of DuPont, U.S.A.). However, the magnetic recording medium which uses this perfluoropolyether as a lubricant has unsatisfactory durability.

To form a lubricating layer of the perfluoropolyether on the magnetic layer, the perfluoropolyether should be diluted with a solvent to form a solution. As the solvent, trichlorotrifluoroethane alone can be used. However, trichlorotrifluoroethane has a low boiling point and easily evaporates. Therefore, it is very difficult to uniformly coat the lubricant on the surface of a magnetic recording medium, and as a result the evaporation loss is large.

SUMMARY OF THE INVENTION

One object of the present invention is to provide a novel halogen-containing polyether which has good lubricating properties.

Another object of the present invention is to provide a lubricant for a magnetic recording medium.

Further object of the present invention is to provide a solvent composition for a lubricant which has little evaporation loss and makes it possible to uniformly coat the lubricant on a substrate.

According to the present invention, there is provided a halogen-containing polyether which comprises a repeating unit structure of the formula:

$$-(CH_2CF_2CF_2O)_a-(CHClCF_2CF_2O)_b-(CCl_2CF_2CF_2O)_c-(CHFCF_2CF_2O)_d-(CFClCF_2CF_2O)_e-(CF_2CF_2CF_2O)_f- \quad (I)$$

wherein a, b, c, d, e and f are each 0 or a positive integer and satisfy the following equations:

$$2 \leq a+b+c+d+e+f \leq 200 \text{ and } 1 \leq a+c+d+f$$

and at least one terminal group selected from the group consisting of groups represented by the formulae:

$$-CH_2OH, -COOR^1, -CONR^1_2, -COOOR^2Ph$$
$$\text{and} -R^2Ph$$

wherein $R^1$ is a hydrogen atom, a $C_1$-$C_5$ alkyl group or an aromatic group, $R^2$ is a divalent organic group and Ph is an aromatic group, and a lubricant comprising the above halogen-containing polyether.

Further, the present invention provides a solvent composition for a lubricant comprising trichlorotrifluoroethane and at least one halogen-containing compound having a boiling point higher than that of trichlorotrifluoroethane.

BRIEF DESCRIPTION OF THE DRAWING

FIGURE is an IR spectrum of the halogen-containing polyether prepared in Example 8.

DETAILED DESCRIPTION OF THE INVENTION

Figure 1:
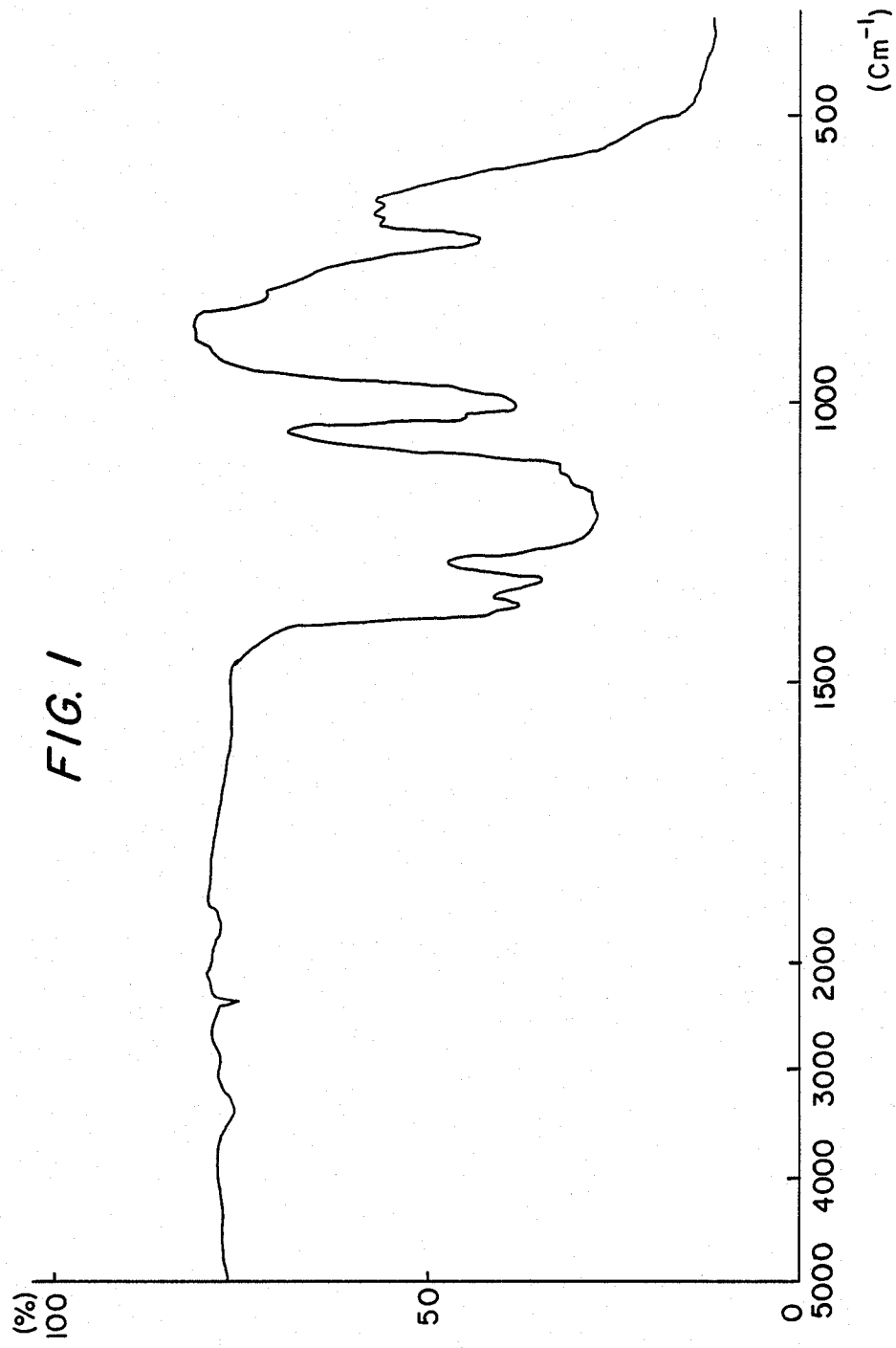

In the terminal groups of the halogen-containing polyether, $R^2$ is preferably a $C_1$-$C_5$ alkylene group which may have one or two ether bonds. The aromatic group may be an aromatic group having 6 to 18 carbon atoms such as phenyl, naphthyl and the like. The aromatic group may have at least one substituent such as a $C_1$-$C_5$ alkyl, a halogen atom or $-NH_2$.

The halogen-containing polyether of the present invention may have the above terminal group at one end or at both ends.

In the formula (I), repeating units in the parentheses are randomly arranged, and formula (I) is not to be interpreted that the repeating units are bonded in this sequence.

Generally, repeating unit structure (I) and the terminal group are bonded through an intermediate group such as $-CH_2CF_2-$, $-CHFCF_2-$, $-CF_2CF_2-$, $-CCl CF_2-$, $-CFClCF_2-$, $-CHClCF_2-$ and the like.

Specific examples of the halogen-containing polyether are $$F-(CF_2CF_2CF_2O)_n-CF_2CF_2COOH \quad (1)$$

in which n is 25 on the average;

$$F-(CF_2CF_2CF_2O)_l-(CHFCF_2CF_2O)_m-CF_2CF_2CH_2OH \quad (2)$$

in which the sum of l and m is 20 on the average, and a ratio of l: m is 8:2 or 7:3;

$$F-(CF_2CF_2CF_2O)_l-(CClFCF_2CF_2O)_m-CF_2CF_2COOCH_3 \quad (3)$$

in which the sum of l and m is 20 on the average, and a ratio of l: m is 9:1;

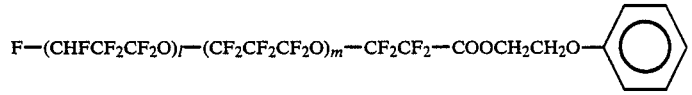

(4)

in which the sum of l and m is 20 on the average, and a ratio of l: m is 7:3;

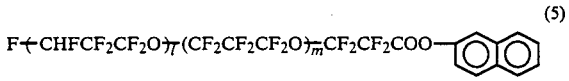 (5)

in which the sum of l and m is 20 on the average, and a ratio of l: m is 7:3;

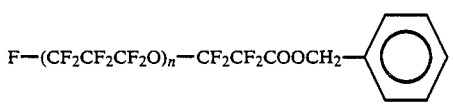 (6)

in which n is 25 on the average;

$$F-(CF_2CF_2CF_2O)_n-CF_2CF_2CH_2OH \quad (7)$$

in which n is 20 on the average;

$$F-(CF_2CF_2CF_2O)_n-CF_2CF_2CONH_2 \quad (8)$$

in which n is 20 on the average.

The halogen-containing polyether of the present invention may be prepared, for example, according to the following reaction scheme:

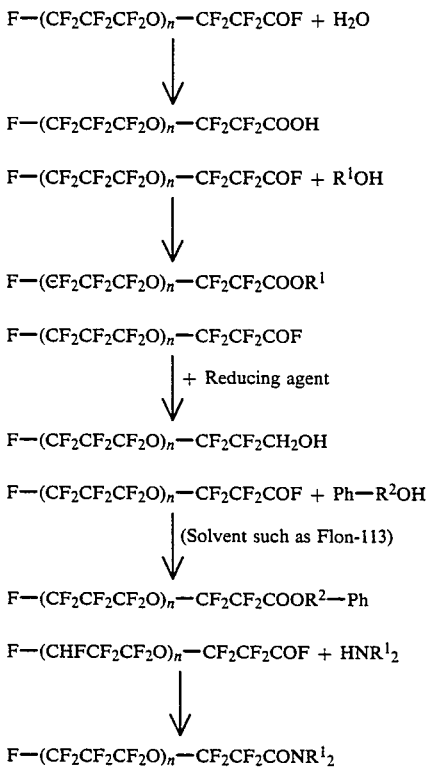

Reaction conditions in above reactions (a) to (d) are as follows:

Reaction (a)

The hydrolysis in this reaction is carried out by adding 2 to 10 moles of water to one mole of the acyl fluoride and stirring the mixture at a temperature of 20 to 100° C. Then, dissolved hydrogen fluoride and water are evaporated off under reduced pressure to give a desired product.

Reaction (b)

The esterification in this reaction is carried out by dropwise adding 1.1 to 2 moles of an alcohol to one mole of the acyl fluoride in a solvent (e.g. trichlorotrifluoroethane) and then heating the mixture to reflux. After reaction, excess alcohol, the solvent and hydrogen fluoride are evaporated off to give a purified desired product.

Reaction (c)

As the reducing agent, sodium boron hydride, lithium aluminum hydride and the like are used. An amount of the reducing agent is not critical. Preferably, the reducing agent is used in an amount of 1 to 2 moles per mole of the carbonyl group in the acyl fluoride to be reduced.

The reducing reaction is carried out preferably in the presence of a solvent. Examples of the solvent are ethers such as diglyme (diethyleneglycol dimethyl ether), tetraglyme (tetraethyleneglycol dimethyl ether) and the like. Although a reaction temperature varies with the kinds of the acyl fluoride, it is preferably from 0° to 160° C. A reaction time also varies with other reaction conditions such as the reaction temperature. It is preferably from 2 to 10 hours.

When the ether is used as the solvent, the prepared halogen-containing polyether alcohol is recovered from the reaction mixture by extracting said alcohol with a suitable extraction solvent such as trichlorotrifluoroethane, perfluorotributylamine and the like. A mixture of the halogen-containing polyether alcohol and the extraction mixture forms a lower phase, which is separated and distilled to remove the solvent. Thereby, the pure halogen-containing polyether alcohol is isolated.

Reaction (d)

This reaction can be carried out in an analogous manner as in Reaction (b).

Reaction (e)

This reaction is carried out by blowing ammonia (when both $R^1$ is hydrogen atoms) or adding a corresponding amine to the acyl fluoride dissolved in a solvent such as trichlorotrifluoroethane. Then, the reaction mixture is filtered, and the solvent is evaporated off to give a desired product.

The halogen-containing polyether (I) having other repeating unit structure can be prepared by an analogous method.

The halogen-containing polyether (I) of the present invention is useful as a lubricant, particularly for the magnetic recording medium.

To form a lubricating layer on the magnetic recording medium, the magnetic recording medium is sprayed by or dipped in a solution of the halogen-containing polyether (I) in a suitable solvent in a concentration of from 0.01 to 0.5% by weight. Examples of the solvent are trichlorotrifluoroethane, Flon-316 and the like. A particularly suitable solvent is a mixture of trichlorotrifluoroethane and at least one halogen-containing compound having a boiling point higher than that of trichlorotrifluoroethane (47° C.). Examples of such halogen-containing compound are:

Tetrachlorodifluoroethane (b.p. 92.8° C.)
Tetrachlorohexafluorobutane (b.p. 133°–134° C.)
Dichlorooctafluorobutane (b.p. 63° C.)

A weight ratio of trichlrotrifluoroethane and the halogen-containing compound varies with the kind of the latter. It is usually from 1:10 to 10:1.

The halogen-containing polyether (I) having the alcoholic hydroxyl group at the molecular end is useful as a raw material for a mold release agent.

PREFERRED EMBODIMENTS OF THE INVENTION

The present invention will be illustrated by following Examples.

EXAMPLE 1

In a polytetrafluoroethylene made flask, $F-(CF_2CF_2CF_2O)_n-CF_2CF_2COF$ (n=25 on the average) (100 g) and water (10 g) were reacted at 60° C. for 10 hours. After removing water by an evaporator, the reaction mixture was analyzed by infrared spectroscopy to find that absorption at 1,890 cm$^{-1}$ disappeared while absorption at 1,780 cm$^{-1}$ appeared. According to this results, the product was identified as $F-(CF_2CF_2CF_2O)_n-CF_2CF_2COOH$ (n=25 on the average).

EXAMPLE 2

In a polytetrafluoroethylene made flask equipped with a reflux condenser, $F-(CHFCF_2CF_2O)_1-(CF_2CF_2CF_2O)_m-CF_2CF_2COF$ (1+m=20 on the average, the ratio of 1: m=7:3) (100 g),

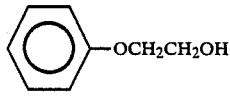

(phenylcellosolve) (30 g) and Flon 113 (100 g) were vigorously stirred for 3 hours. After kept standing, the lower phase was recovered and washed with water three times.

The washed liquid was heated to 100° C. in an evaporator to remove water and a trace amount of phenylcellosolve.

Then, to the liquid, small particulate silica gel (60 to 100 mesh) (10 g) was added and stirred at room temperature for 10 hours, followed by filtering through a 0.2 μm micropore filter to obtain an oily product (98 g).

Elementary analysis, IR spectrum and NMR analysis confirmed that the oily product was a compound of the formula:

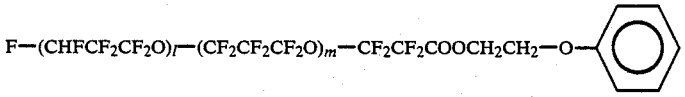

EXAMPLE 3

On a coating type hard disc, a 0.1 wt. % solution of $F-(CF_2CF_2CF_2O)_n-CF_2CF_2COOH$ (n=25 on the average) in trichlorotrifluoroethane was spin coated to form a lubricating layer of 100 Å in thickness.

Durability of the disc having the lubricating layer was tested by a CSS tester. There was no head crush after 50,000 (10 discs being used).

EXAMPLE 4

In the same manner as in Example 3 but using $F-(CF_2CF_2CF_2O)_1-(CHFCF_2CF_2O)_m-CF_2CF_2CH_2OH$ (1+m=20 on the average, the ratio of 1: m=8:2) as the halogen-containing polyether, a hard disc having a lubricating layer was produced. In the durability test by using the CSS tester, the disc caused no trouble after 50,000 runs (5 discs being used).

EXAMPLE 5

In a 0.05 wt. % solution of

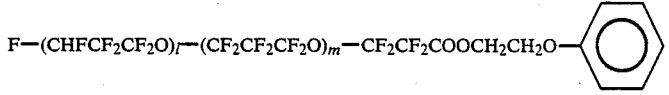

(1+m=20 on the average, the ratio of 1: m=7:3) in trichlorotrifluoroethane, a spatter type hard disc having a carbon layer as the uppermost layer was dipped and pulled up at a rate of 5 cm/min. Thereafter, the disc was air dried to form a lubricating layer of 100 Å in thickness.

Durability of the disc having the lubricating layer was tested by a CSS tester. There was no trouble after 20,000 runs.

EXAMPLE 6

In the same manner as in Example 5 but using

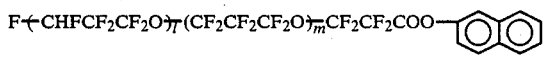

(1+m=20 on the average, the ratio of 1: m=7:3) as the halogen-containing polyether, a hard disc having a lubricating layer was produced.

Durability of the disc having the lubrication layer was tested by a CSS tester. There was no trouble after 50,000 runs.

EXAMPLE 7

In the same manner as in Example 5 but using

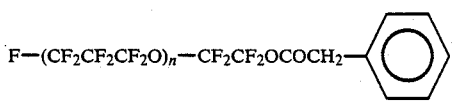

(n=25 on the average) as the halogen-containing polyether, a hard disc having a lubricating layer was produced.

Durability of the disc having the lubrication layer was tested by a CSS tester. There was no head crush after 20,000 runs.

COMPARATIVE EXAMPLE 1

In the same manner as in Example 3 but using F—[CF(CF$_3$)CF$_2$O]$_p$—CF$_2$CF$_3$ (Krytox, a trade name of DuPont, U.S.A., an average molecular weight of 4,000) in place of the halogen-containing polyether of the present invention, a hard disc having a lubricating layer was produced.

Durability of the disc having the lubricating layer was tested by a CSS tester. The head crush occurred between 3,000 and 7,000 runs (5 discs being used).

The halogen-containing polyether of the present invention can impart 2 to 20 times better durability to the magnetic recording medium than the conventional halogen-containing polyether.

EXAMPLE 8

To a mixture of diglyme (1,000 g) and NaBH$_4$ (57 g) contained in a glass made three-necked 5 liter flask, F—(CF$_2$CF$_2$CF$_2$O)$_n$—CF$_2$CF$_2$COF (n=20 on the average) (1,500 g) was dropwise added over 2 hours with stirring. After the addition of the acyl fluoride, the reaction mixture was heated to 80° C. and reacted for 2 hours. After cooling the mixture to room temperature, water (2 liters) was gradually added thereto. Then, trichlorotrifluoroethane (1,500 ml) was added and stirred. The mixture was kept standing and separated into two phases. The lower organic phase was recovered and washed with water (2 liters) three times. After removing trichlorotrifluoroethane by an evaporator, low boiling point materials were removed under reduced pressure to obtain an oily product (1,400 g). In an infrared spectrum, absorption by the carbonyl group of the raw material acyl fluoride disappeared and absorption by the hydroxyl group appeared as shown in FIGURE.

EXAMPLE 9

To a mixture of tetraglyme (130 g) and NaBH$_4$ (10 g) contained a glass made three-necked 500 ml flask, F—(CF$_2$CF$_2$CF$_2$O)$_1$—(CHFCF$_2$CF$_2$O)$_m$—CF$_2$CF$_2$COF (1+m=20 on the average, the ratio of 1: m=7:3) (150 g) was dropwise added over one hour with stirring. After the addition of the acyl fluoride, the reaction mixture was heated to 100° C. and reacted for 2 hours. In the same manner as in Example 8, an oily product (130 g) was recovered. In an infrared spectrum of the oily product, absorption by the carbonyl group disappeared and absorption by the alcohol group appeared.

EXAMPLE 10

To a mixture of trichlorotrifluoroethane (100 g) and

(2.8 g) contained in a three-necked 200 ml flask equipped with a reflux condenser, F—(CF$_2$CF$_2$CF$_2$O)$_n$—CF$_2$CF$_2$(CH$_2$CH$_2$)$_2$I (n=20 on the average) (71.9 g) was dropwise added over 2 hours with stirring. After the addition of the polyether, the reaction mixture was stirred for 5 hours. After removing trichlorotrifluoroethane, the reaction mixture was filtered to obtain a liquid product (70.0 g). IR spectrum and NMR analysis of the product confirmed that it was a compound of the formula:

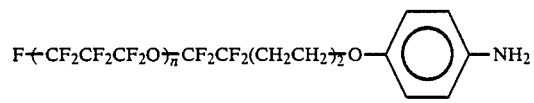

(m=20 on the average).

EXAMPLE 11

In a mixed solvent of 70% by weight of trichlorotrifluoroethane and 30% by weight of tetrachlorodifluoroethane, F—(CF$_2$CF$_2$CF$_2$O)$_n$—CF$_2$CF$_3$ (an average molecular weight of 8,400) was dissolved in a concentration of 0.05% by weight to prepare a lubricant solution. Then, a hard disc having a carbon layer as the uppermost layer was dipped in the solution and pulled up at a rate of 5 cm/min. followed by drying to form a lubricating layer.

Durability of the disc having the lubricating layer was tested by a CSS tester. Head crush occurred after 9,000 to 15,000 runs (10 discs being used).

EXAMPLE 12

In the same manner as in Example 11 but using a mixed solvent of 90% by weight of trichlorotrifluoroethane and 10% by weight of tetrachlorohexafluorobutane as a solvent, a hard disc having a lubricating layer was produced.

Durability of the disc having the lubrication layer was tested by a CSS tester. Head crush occurred after 10,000 to 15,000 runs (10 discs being used).

COMPARATIVE EXAMPLE 2

In the same manner as in Example 11 but using trichlorotrifluoroethane alone as a solvent, a hard disc having a lubricating layer was produced.

Durability of the disc having the lubrication layer was tested by a CSS tester. Head crush occurred after 3,000 to 7,000 runs (10 discs being used).

What is claimed is:

1. A halogen-containing polyether which comprises a repeating unit structure of the formula:

$$-(CH_2CF_2CF_2O)_a-$$
$$-(CHClCF_2CF_2O)_b-(CCl_2CF_2CF_2O)-$$
$$_c-(CHFCF_2CF_2O)_d-(CFClCF_2CF_2O)_e-(CF_2CF_2CF_2O)_f- \quad (I)$$

wherein a, b, c, d, e and f are each 0 or a positive integer and satisfy the following equations:

$$2 \leq a+b+c+d+e+f \leq 200 \text{ and } 1 \leq a+c+d+f$$

and at least one terminal group selected from the group consisting of groups represented by the formulas:

—CH$_2$OH, —COOR$^1$, —CONR$_2^1$, —COOOR$^2$Ph
and —R$^2$Ph wherein R$^1$ is a hydrogen atom, a C$_1$-C$_5$ alkyl group or an aromatic group, R$^2$ is a divalent organic group and Ph is an aromatic group.

2. The halogen-containing polyether according to claim 1, wherein the repeating unit structure consists of the repeating units of the formula: —(CF$_2$CF$_2$CF$_2$O)$_a$—.

3. The halogen-containing polyether according to claim 1, wherein the repeating unit structure consists of the repeating units of —(CF$_2$CF$_2$CF$_2$O)$_a$— and —(CHFCF$_2$CF$_2$O)$_d$—.

4. A lubricant comprising a halogen-containing polyether according to claim 1.

5. A lubricant for a magnetic recording medium comprising a halogen-containing polyether according to claim 1.

6. A composition comprising 0.01 to 0.5% by weight of a halogen-containing polyether according to claim 1 and 99.99 to 99.5% by weight of a mixed solvent consisting of 1 to 10 parts by weight of trichlorotrifluoroethylene and 10 to 1 parts by weight of at least one solvent selected from the group consisting of tetrachlorodifluoroethane, tetrachlorohexafluorobutane and dichlorooctafluorobutane.

* * * * *